United States Patent [19]

Gingras

[11] Patent Number: 4,506,433
[45] Date of Patent: Mar. 26, 1985

[54] MACHINE FOR BENDING AND SHEARING SHEET METAL

[76] Inventor: Roger Gingras, 1245 Marie-Victorin, Saint-Nicolas, Québec, Canada, G0S 2Z0

[21] Appl. No.: 502,950

[22] Filed: Jun. 10, 1983

[51] Int. Cl.³ .................... B21D 5/01; B23P 23/00
[52] U.S. Cl. .......................... 29/560; 72/324; 72/464; 83/552
[58] Field of Search ............... 29/560, 560.1; 72/442, 72/324, 389, 464; 83/598, 599, 200, 699, 552, 564

[56] References Cited

U.S. PATENT DOCUMENTS 3,616,525 11/1971 Barthel .................................. 29/560
3,875,655 4/1975 Gerlach ................................. 29/560

FOREIGN PATENT DOCUMENTS 210715 1/1960 Austria .................................. 83/552
2117335 9/1972 Fed. Rep. of Germany ........ 72/324

Primary Examiner—Z. R. Bilinsky
Attorney, Agent, or Firm—Schwartz, Jeffery, Schwaab, Mack, Blumenthal & Koch

[57] ABSTRACT

The bending and shearing machine according to the invention comprises a framework, a table which can be vertically displaced and on which sheet metal, such as steel sheets, may slide as well as a rocker head which can be pivoted 180°. The displacement of the table is carried out by means of a system including levers and pistons. One of the horizontal edges of the rocker head carries a knife while the other holds a wedge or a bending roller. The table includes a cutting matrix which carries a knife mounted at the end of the table and a bending matrix shaped to rest on the cutting matrix. The rocker head pivots according to an eccentric axis so that its knife and its wedge or bending roller are offset with respect to one another when they are in operation.

27 Claims, 12 Drawing Figures

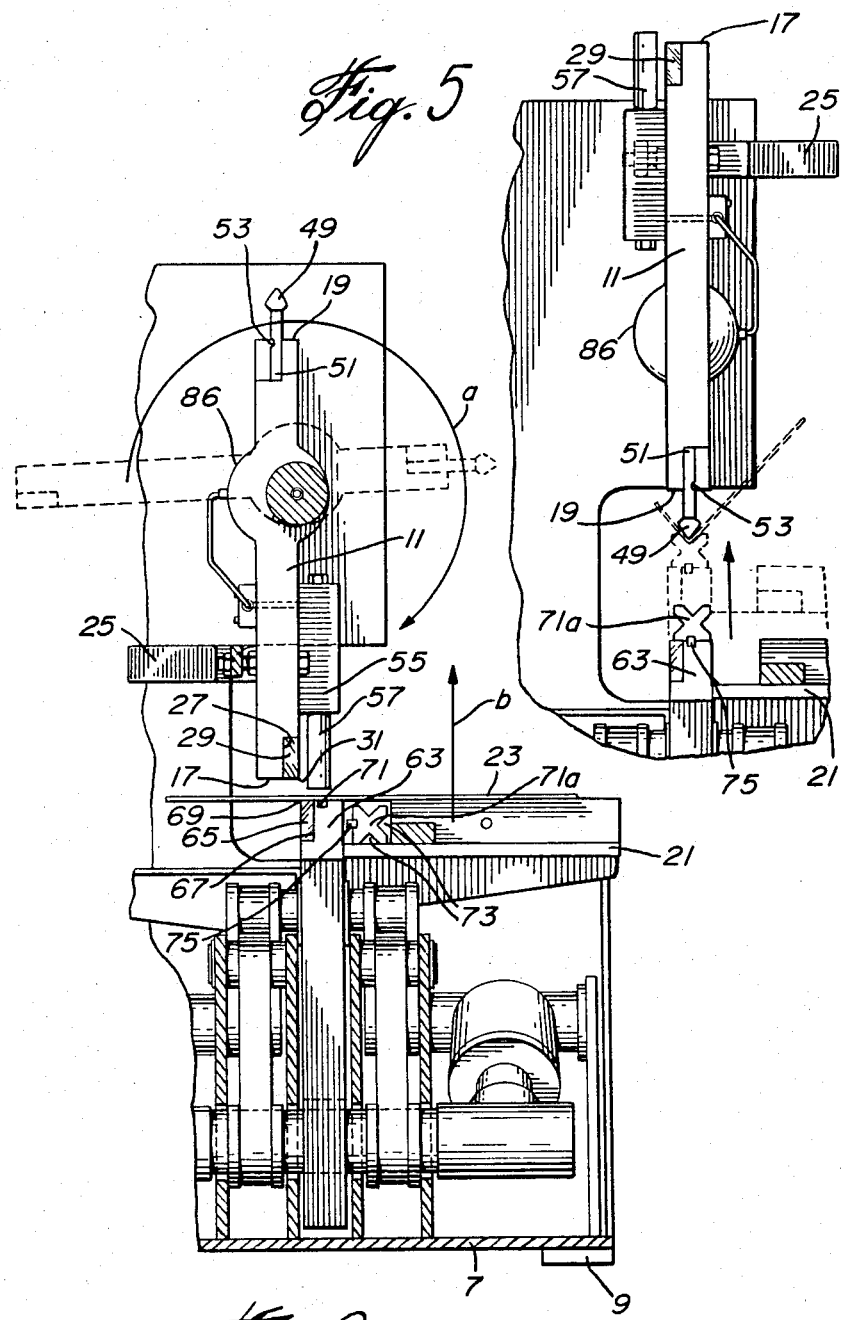

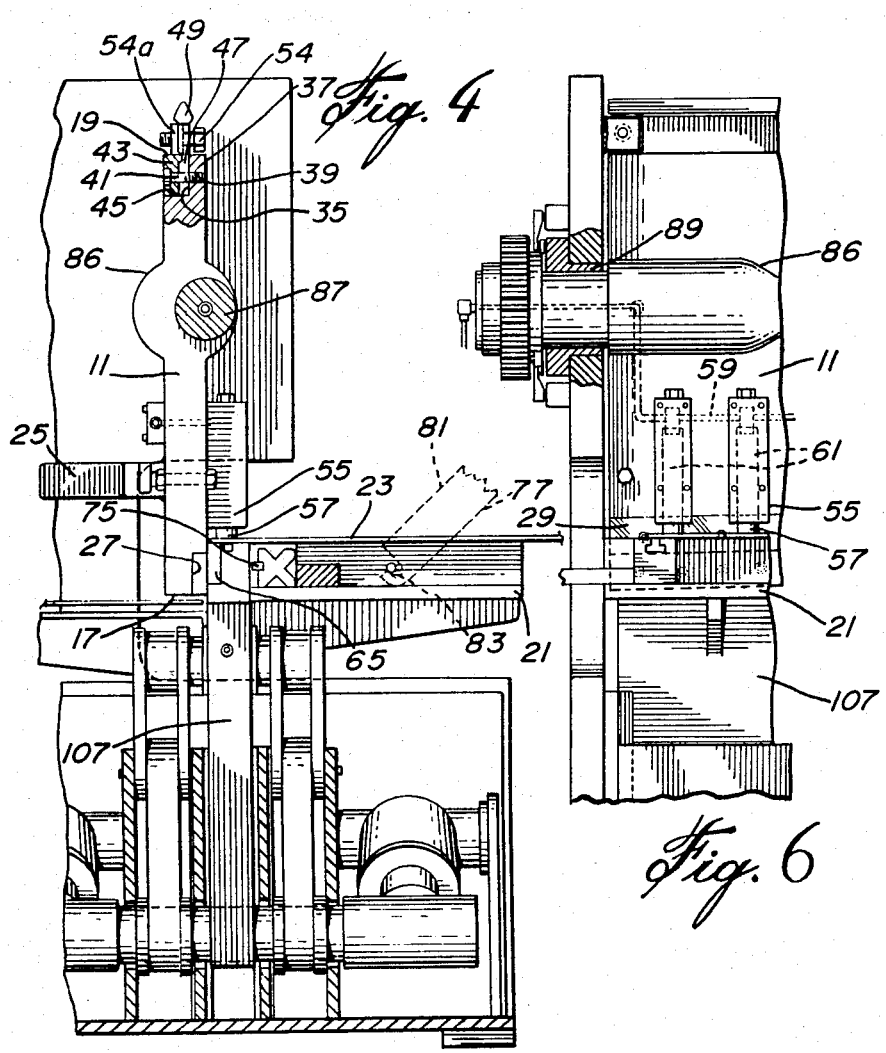
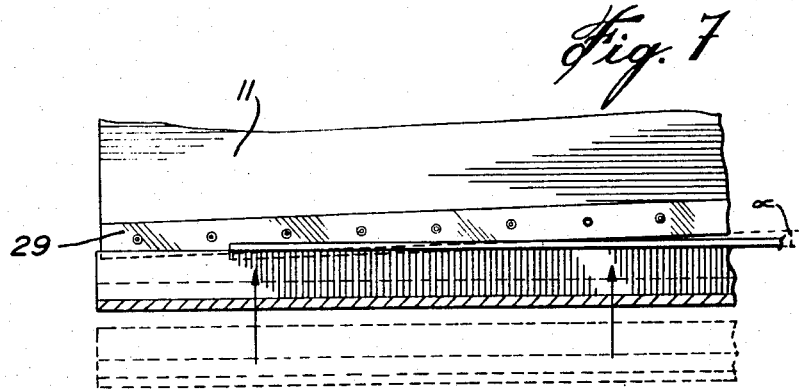

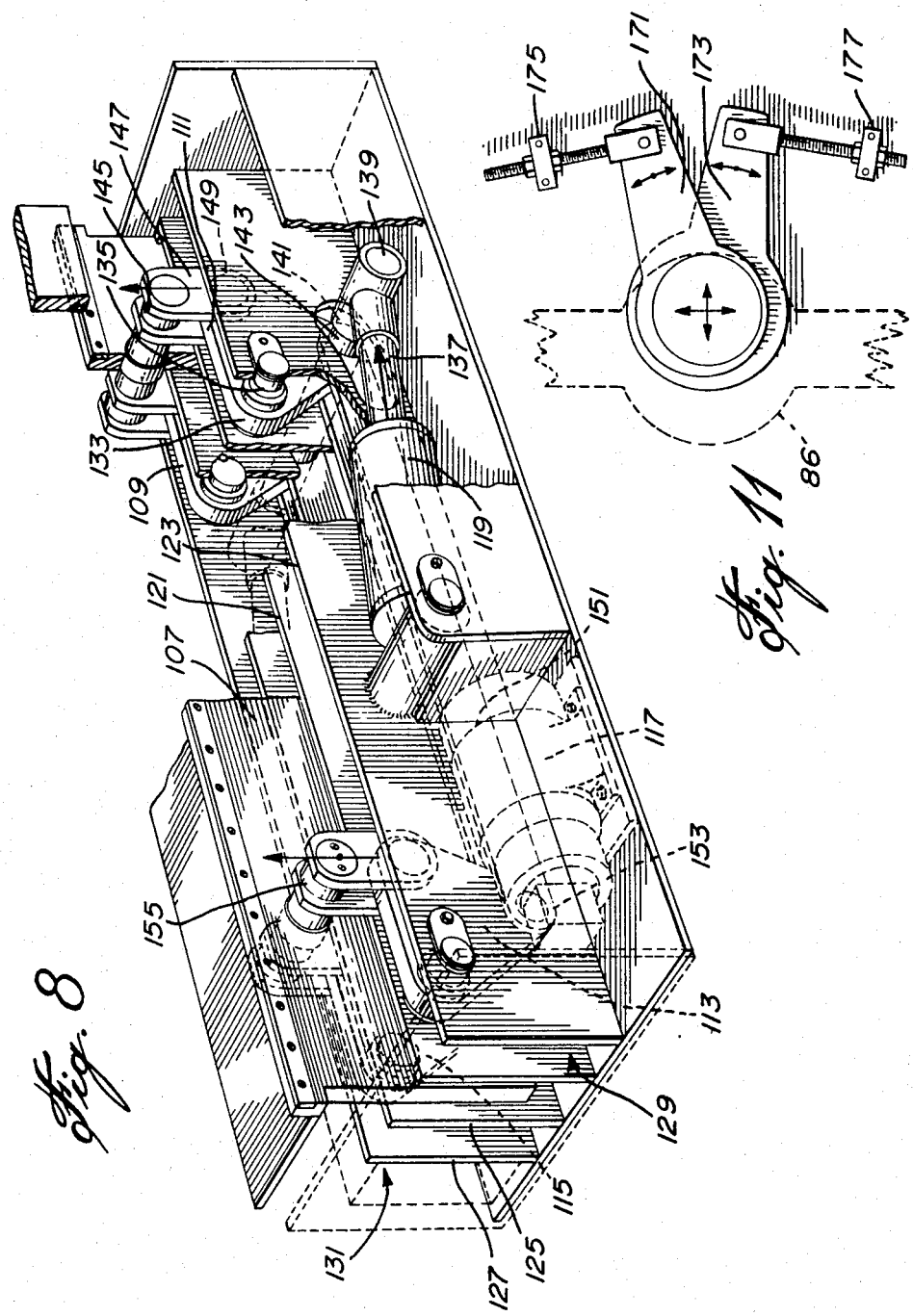

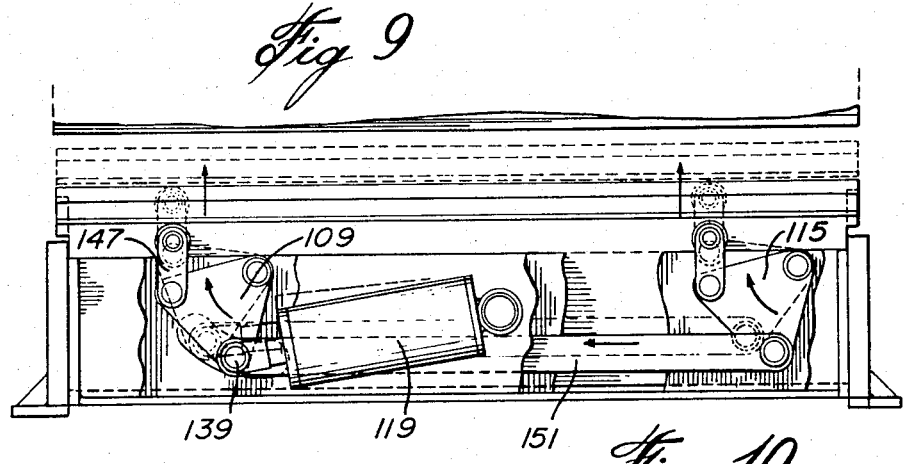
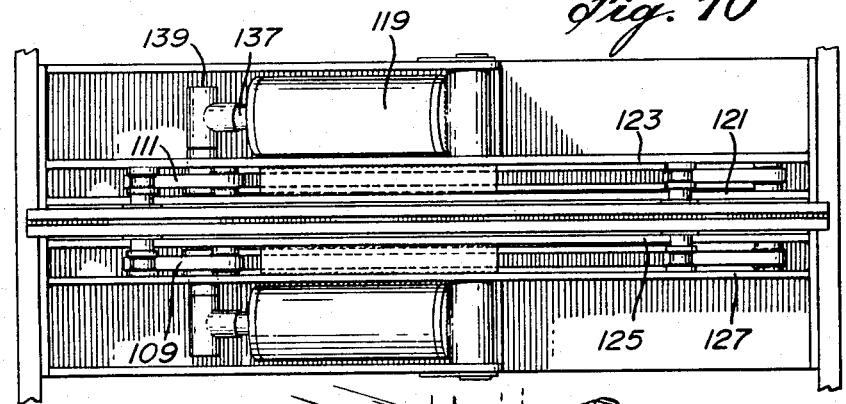
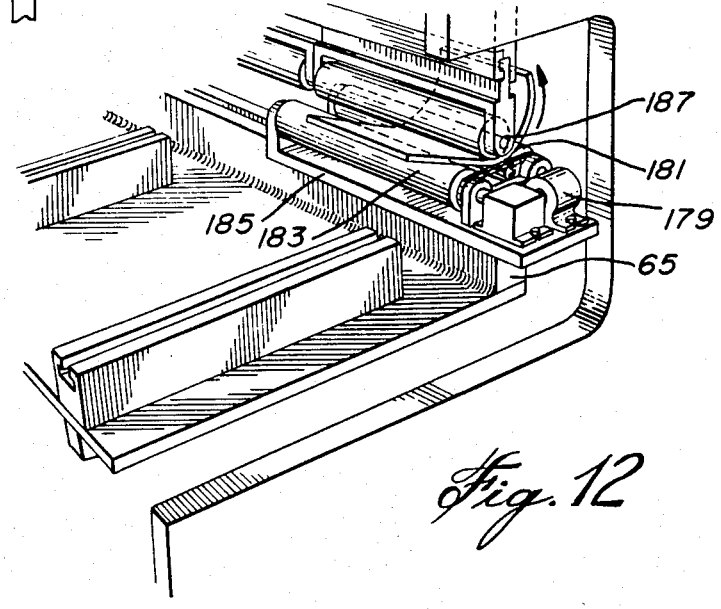

4,506,433

MACHINE FOR BENDING AND SHEARING SHEET METAL

BACKGROUND OF THE INVENTION (a) Field of the Invention

The present invention concerns a bending and shearing machine for sheet metal. More particularly, the invention is directed to an arrangement which, by simple inversion of some of its constituting parts, enables carrying out of a bending or a shearing operation. In other words, the machine according to the present invention is effective to combine two machines in one.

(b) Description of Prior Art

It is known that the heavy machinery which is used, such as to work with metals, is of large dimension and also very costly. It is well known that to bend and shear sheet metal or the like, two different machines are usually needed. It is obvious that this requirement implies cost and space utilizations which are quite important. To Applicant's knowledge, there is no combined system which is practical and not too costly.

U.S. Pat. No. 1,036,359 describes a machine for shearing metal into strips and to bend the latter in U shape. A head carries a knife and a wedge and a device enables to alternate the movement of the knife and of the wedge. U.S. Pat. No. 3,214,955 is essentially a sheet metal bending machine. The same is true with respect to U.S. Pat. No. 3,587,286. In U.S. Pat. No. 3,668,919, the downward movement of the press brake for shearing or bending is carried out through a complicated mechanism. U.S. Pat. No. 4,187,601, U.S. Pat. No. 4,223,545 and DT No. 2,844,867 are believed to be of interest but are not considered perminent to the present invention.

There is, therefore, a need to be able to provide a machine which is of simple construction and not costly and which can simultaneously serve to bend and shear sheet metal or the like.

SUMMARY OF THE INVENTION

Broadly, the present invention concerns a machine for bending and shearing sheet metal comprising a framework, said framework including two upright members defining the lateral ends of said framework, a rocker head formed of a first horizontal edge and a second horizontal edge, a pivoting device to mount said rocker head between the two upright members on the upper part of said framework so as to enable said rocker head to pivot between said two upright members, the first edge of said rocker head comprising means for cutting said metal sheet and said second edge comprising a wedge for bending said metal sheet, control means associated with said pivoting device to cause said rocker head to adopt a first vertical position in which the first edge and its cutting means are located at the lower end of said rocker head, said control means also enabling to cause pivoting of said rocker head 180° so as to cause the rocker head to adopt a second vertical position in which, this time, the second edge and its bending wedge are located at the lower end of said rocker head, said framework comprising a table on which a sheet metal may move, means enabling said table to be vertically displaced to be drawn towards or away from the lower end of said rocker head, said table also comprising a primary longitudinal cutting matrix, said primary matrix being mounted at one internal end of said table and comprising a knife forming its internal edge, a secondary longitudinal bending matrix shaped to rest on the upper face of said primary matrix, and secondary matrix comprising shaping means in back of said knife to enable bending of said sheet metal by the combined action of the bending wedge and of the shaping means, a cam associated with the pivoting device so that when the rocker head is in said first position, said cutting means, following drawing of the table towards the cutting means, slide along the internal face of said knife to shear the sheet metal, and after having pivoted the rocker head 180°, the latter occupies said second position, the bending wedge is aligned with said shaping means to bend said sheet metal as a result of lifting of said table.

BRIEF DESCRIPTION OF DRAWINGS

The invention will now be illustrated, without being restricted thereto, with reference to the annexed drawings in which:

FIG. 3 is a partial section view showing the start of the shearing operation;

FIG. 4 is a partial section view showing the end of the shearing operation;

FIG. 5 is a view similar to FIG. 3 illustrating the bending operation;

FIG. 6 is a view of the mechanism enabling the pivoting of the rocker head;

FIG. 7 shows the inclination of the knife with respect to the table;

FIG. 8 is a perspective view of the mechanism enabling to raise and lower the table;

FIG. 9 is a side view, partially cut away, of the mechanism illustrated in FIG. 8, showing the rise of the table;

FIG. 10 is a view from the top of the same mechanism;

FIG. 11 is a view of a device enabling to adjust the pivot for controlling the level of the rocker head; and FIG. 12 is a perspective view of an alternate form of bending device.

DESCRIPTION OF PREFERRED EMBODIMENTS

Figure 1:
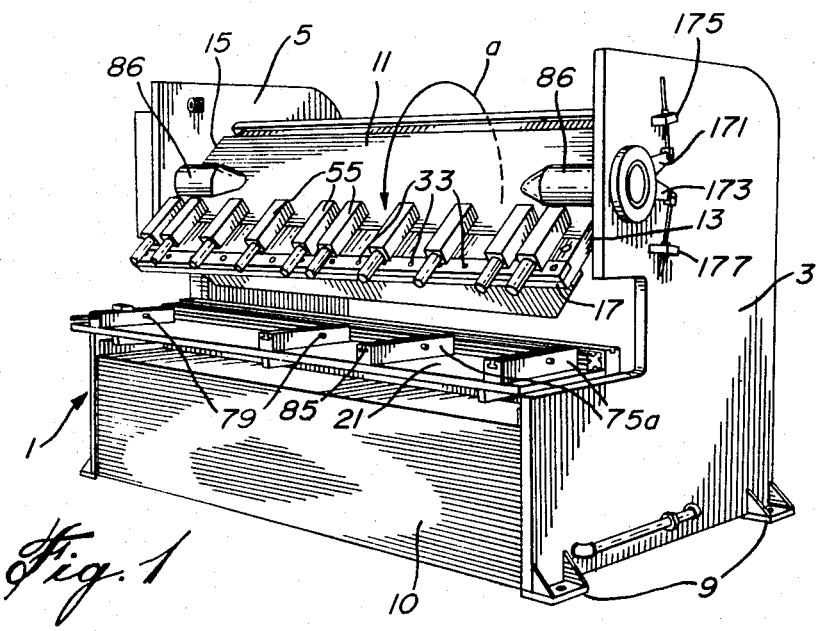
FIG. 1 is a perspective view of a bending and shearing machine according to the present invention.
Figure 2:
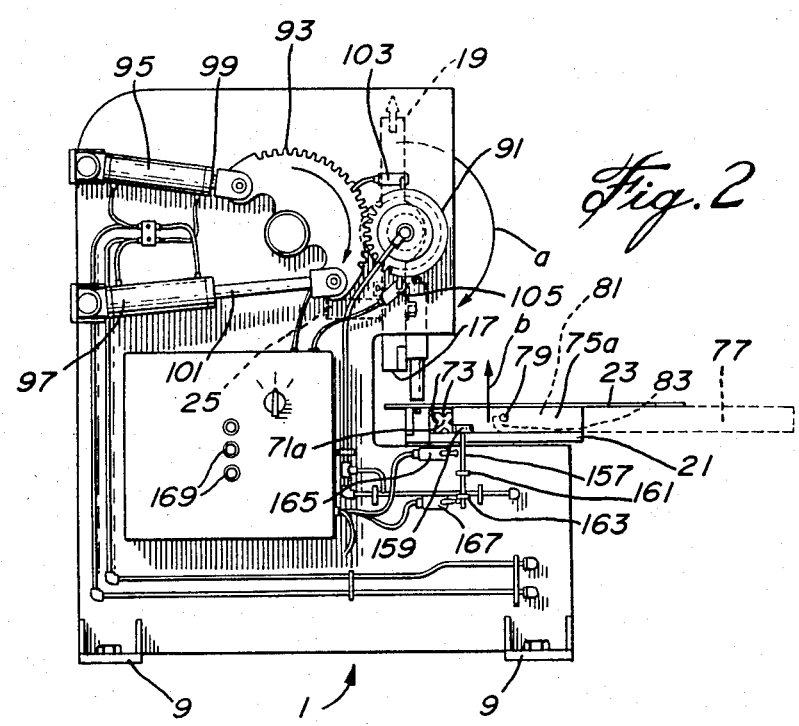
FIG. 2 is a side view of the same machine showing the mechanism enabling the pivoting of the rocker head.

With reference to the drawings, more particularly FIGS. 1 and 2, it will be seen that the machine which is illustrated comprises a framework 1 which somewhat resembles the shape of a bench. The framework 1 comprises two upright members 3 and 5 of irregular shape, forming the lateral ends of the framework. The framework 1 also comprises a base 7 (FIG. 3) resting on legs 9, as well as a front panel 10 and a rear panel not illustrated in the drawings. With reference to FIGS. 1, 3 and 4, it will be seen that an important part of the machine comprises the rocker head 11. The latter is generally rectangular and obviously comprises two lateral edges 13 and 15 as well as two longitudinal edges, which, in the present case, will be referred to as horizontal edges and will be identified by reference numerals 17 and 19. Finally, there is a pivoting device, which is mainly the object of FIG. 2, and which will be described in detail hereinbelow, said pivoting device serving to mount the rocker head 11 on the upper part of the framework 1 between the two upright members 3 and 5, so as to enable it to pivot between the two upright members 3 and 5 in the direction indicated by the arrow a in FIGS. 1, 2 and 3, or in a direction opposite to that of the arrow a. Finally, the machine also comprises as a main component thereof, a table 21 on which a sheet metal 23 can move (FIGS. 2, 3 and 4). To complete the machine, there is a mechanism which will be described in detail hereinbelow, enabling the table to be vertically displaced to be drawn towards (according to arrow b of FIGS. 2 and 3) or away from the lower end of the rocker head 11, constituted by the edge 17 or edge 19.

Referring again to rocker head 11, it should first of all be mentioned that the latter should be made of very solid material in order to enable it to be resistant to the very high pressures which it will undergo during the bending or shearing of metallic sheets, in most cases steel sheets, which are most of the time quite heavy. For this reason, the rocker head 11 is usually made of a rectangular steel member which is sufficiently thick to keep it rigid under conditions of very high pressures. In order to give it even more greater rigidity, a reinforcing member 25 of rectangular cross-section is welded on the rear face of the rocker head 11, when the latter is in shearing position. Reference is made to FIGS. 2 to 5 of the drawings. More specifically, it will be noted with reference to the drawings, the reinforcing member 25 is provided along the edge 17, at a short distance of the latter.

Along edge 17 of the rocker head 11, there is a rectangular cut out portion 27 made by any means known in the art, in the material of the rocker head. A knife 29, having a cutting edge 31, is fixedly mounted in the cut out portion by means of bolts 33, all in known manner.

With respect to the second horizontal edge 19 of the rocker head 11, it is also provided with a rectangular cut out portion which will be identified by reference numeral 35. The flange 37 resulting from the cut out portion 35 has a series of aligned threaded holes 39 intended to screw bolts 41 therein. A flange plate 43, provided with holes corresponding to threaded holes 39 and whose height corresponds to that of the cut out portion 35, rest on the base 45 of the cut out portion 35. It is connected to the flange 37 by means of bolts 41 so as to define a longitudinal channel along the edge 19. A wedge-carrying-plate 47, formed of a bending wedge 49, a lug 51 and an abutment 53 is held in the longitudinal channel between the flange plate 43 and the flange 37. It is mainly held therein by means of bolts 41, the flange plate 43 and the abutment 53. In order to prevent the rocker head 11 to pivot when it is in cutting position, such as illustrated in FIG. 4, there is provided a bolt 54 which is bolted at 54a. This aspect of the machine obviously does not form part of the invention.

On the other hand, in order to prevent any movement of the sheet metal during the cutting operation, the rocker head 11 should provide pressure means which can rest against the sheet metal. These pressure means are constituted of constant pressure cylinders 55 with holding rods 57 aligned along the edge 17 of the rocker head 11. These constant pressure cylinders are effectively hydraulic pistons which are connected to an oil reservoir not illustrated. For this purpose, there is provided a hydraulic fluid duct 59 (FIG. 6) which is horizontally mounted on the face of the rocker head opposite the constant pressure cylinders 55. Along the hydraulic fluid duct 59, there are junctions 61 enabling the introduction of the hydraulic fluid in each cylinder 55. These junctions 61 and a pressure valve (not illustrated) provided along the duct 59 are constructed so as to maintain a constant pressure inside the cylinders 55. In this manner, when the table is drawn near the knife 29, in the direction illustrated by the arrow b, the holding rods 57 rest on the sheet metal 23, as can be seen in FIG. 4, with a sufficient pressure to prevent any movement of the sheet metal during the cutting thereof.

To make sure that the cutting operation is carried out efficiently, the edge 17 which carries the knife 29 should preferably be slanted according to angle $\alpha$ with respect to the surface of the table 21. Reference will be particularly made to FIG. 7 of the drawings.

With reference to FIGS. 1, 2, 3 and 4 of the drawings, it will be noted that the table 21 comprises a primary longitudinal cutting matrix 63, which is placed at the internal end of the table. The primary matrix 63 is made of a rectangular rod whose rear face has been cut away as shown in the drawings. A rectangular knife 65, identical to knife 29, is embedded into the rectangular cut out portion 67 formed at the rear of the rectangular rod. This knife 65, as would be expected, has a cutting edge 69 which constitutes the internal edge of the rectangular rod and consequently of the primary matrix 63. Moreover, the upper face of the primary matrix is formed of a recess 71 which is in back of the rectangular knife 65. As will be seen later, this recess 71 is intended to prevent any movement of the secondary matrix which will now be described, when the latter has been placed on the primary matrix and the rocker head is in bending position.

The machine also comprises the secondary longitudinal bending matrix 71a which is shaped to sit on the upper face of the primary matrix 63. The secondary matrix 71 includes grooves 73 (FIG. 2) of various shapes depending on the degree of bending that it is ultimately desired to obtain. Moreover, the secondary matrix comprises a tongue 75 which extends along the entire length of the secondary matrix and which can be inserted in the recess 71 of the primary matrix in bending position of the machine. More specifically, these grooves 73 are V-shaped, and the degree of opening varies depending on the degree of bending which should be obtained.

Returning to table 21, it will be noted that the latter contains a certain number of transverse members 75a on which the sheet metal can slide. With reference to FIGS. 2 and 4, it will be noted that each tranverse member comprises an extension 77 which enables to increase the support surface of the table, on the transverse members 75a. Each of the tranverse members is provided with a lug 79 on its lateral side. With respect to the extensions, it will be noted that each of them is extended with a pair of flanges 81 terminated by a hook 83 so that when it is desired to have a larger support surface, one slides the pair of flanges 81 along the lateral sides of a transverse member until the hooks 83 engage the lug 79 thus providing a larger support surface for the sheet metal 23.

Each transverse member 75a comprises a slit 85 on its upper face. This slit enables to receive a stopper (not illustrated) which enables to determine the distance between the end of a sheet metal 23 to be cut or bent and an intended cutting or bending line.

It has previously been mentioned that the rocker head 11 is mounted on a pivoting device 21. In order to use the machine either for holding or for cutting a sheet metal, the rocker head should be pivoted 180° in order to adopt one of the two positions mentioned above. Moreover, this pivoting device 21 should be associated with an eccentric axis. Indeed, when the rocker head is in cutting operation, it will be noted, with reference to FIGS. 2, 3 and 4, that following the drawing of the table towards the edge 17 of the rocker head 11 carrying the knife 29, the edge 31 of the latter slides along the internal face of the knife 65. On the other hand, when the rocker head has pivoted 180° to be in bending position, the bending wedge is aligned with one of the grooves 73 of the secondary matrix 71a when the latter is placed on the primary matrix 63. However, in view of the characteristics of the primary and secondary matrices, and in order to have a successful operation, the wedge 49 should be in back of the knife 27. This is the reason why the pivoting device should be associated with an eccentric axis.

Referring more particularly to FIGS. 2, 3 and 4, it will be noted that the pivoting device 21 comprises cylindrical members 86 formed from the rocker head, at the two lateral ends 13 and 15 thereof, and according to the horizontal axis of the rocker head. The cylindrical members 86 each comprise an extension 87 which extends outside the rocker head and which is similarly eccentric with respect to the axis of the cylindrical members 86. A bushing 89 is disposed in each of the two upright members 3, 5 and each of the eccentric extensions 87 extends through one of the two upright members by means of the bushing 89 which is disposed in the upright member. The two extensions 87 extend on the other hand outside the framework as will be seen in FIG. 6. A partially toothed gear 91 is mounted at the end of one of the eccentric extensions 87, while a toothed gear segment 93 engages the partially toothed gear. On the other hand, two pistons 95, 97 operating in reverse direction, are mounted on the framework and it will be noted that their rods 99, 101 are connected at the ends of the gear segment 93. Limit switches 103, 105 are connected to pistons 95, 97 in known manner, so that when the pistons are in operation, the rocker head will pivot only until the knife 29 will be perfectly aligned with the knife 65, or, in reverse direction, when the bending wedge 49 will be aligned with one of the grooves of the secondary matrix 71a.

It has previously been mentioned that the table must be vertically displaced along arrow b (FIG. 3) or in opposite direction. The device enabling this displacement comprises a vertical support 107 of the table 21. Also, there are provided triangular levers 109, 111, 113 and 115, as well as a motor 117 and a hydraulic piston 119. On both sides of the vertical support 107, there are two pairs of plates 121, 123, 125 and 127. These two pairs of plates are parallel to one another and are disposed on both sides of the vertical support 107. The space between each pair of plates constitutes a lever chamber 129 or 131. The triangular level 111 is pivotally mounted at its upper part 133 at 135 on the pair of plates 121, 123, at one end of the chamber 129. The second triangular lever 113 is mounted in the same manner, and on the same pair of plates 121, 123, but at the other end of the lever chamber 129. It has previously been mentioned that there is a hydraulic piston 119 as well as a motor to operate the piston. The piston is connected by means of a rod 137 to an axle 139, which is pivotally connected at the top 141 of the triangle 111 at 143. An axle 145 is connected to the vertical support 107 so as to pull the latter upwardly or downwardly, upon the movement of this axle. A mechanical link 147 which is pivoted at both ends thereof as will be seen in FIG. 8 of the drawings, connects the axle 145 and the top part 149 of the triangle lever 111. A pivoting connection 151 connects the apex 141 of the triangular lever 111 to the corresponding apex 153 of the second triangular lever 113. An axle 155 is connected to the vertical support 107 at the opposite end of the lever chamber so as to pull the vertical support 107 in the same manner as under the action of the first triangular lever, so that under the action of the piston in either direction, the vertical support raises or lowers the table 21 in an perfectly horizontal manner.

In order to prevent the table from being displaced passed a normal vertical upper and lower limit, there is provided a vertical rod 157 (FIG. 2) connected to the table by means of a button 159. Along the rod, there is an upper contact 161 as well as a lower contact 163. Limit switches 165, 167 are provided to touch the contacts 161, 163 so that when they get into contact, they will stop either the upward or downward motion of the table.

In order to enable the rocker head to pivot in one direction or the other, and to raise or lower the table, there are provided the controls 169 whose structure does not form part of the present invention.

Finally, it is very important that the rocker head be perfectly horizontal when it is in bending position or be at a specific angle when it is in cutting position. For this purpose, there is provided a combination of two cams 171, 173 which can be adjusted at 175, 177, to make sure that the rocker head 11 is perfectly horizontal. Finally, according to an embodiment, the bending can be carried out by using a system of rollers. Reference will now be made to FIG. 12 of the drawings. For this purpose, a motor 179 is provided to be associated with two rollers 181, 183 mounted on a frame 185, which is disposed on the primary matrix 165. Instead of the bending wedge 49, there is provided a roller 187 whose rotation is due to the rotation of the two rollers 181, 183. For bending, it is merely sufficient to insert the sheet metal in the system of rollers.

The operation of the device according to the invention is obvious. It is merely sufficient to place a sheet metal on the table 11 and to pivot the rocker head in one direction or other depending on whether it is intended to cut or bend the sheet metal. Once the machine has been set, it should only be necessary to raise the table to a certain level for cutting and to another level for bending the sheet metal.

If the system of rollers according to FIG. 12 it intended to be used, it is merely sufficient to insert a sheet metal between the three rollers.

Finally, it will be noted that only two triangular levers forming part of the lever chamber 129 have been described. It is obvious that the arrangement of the lever chamber 131 is identical to that of the chamber 129.

I claim:

1. A machine for bending and shearing sheet metal comprising a framework, said framework including two upright members defining the lateral ends of said framework, a rocker head having a first horizontal edge and a second horizontal edge, a pivoting device for mounting said rocker head between the two upright members on the upper part of said framework so as to enable said rocker head to pivot between the two upright members, the first edge of said rocker head comprising means for cutting said sheet metal and the second edge comprising a wedge for bending said sheet metal, control means associated with said pivoting device to enable the rocker head to adopt a first vertical position in which the first edge and its cutting means are located at the lower end of said rocker head, said control means also enabling the rocker head to pivot 180° so as to adopt a second vertical position in which, the second edge and its bending wedge are located at the lower end of said rocker head, said framework comprising a table on which the sheet metal can move, means enabling the table to more vertically be drawn towards or away from the lower end of said rocker head, said table also comprising a longitudinal cutting primary matrix, said primary matrix being placed at an inner end of said table and comprising a knife forming its inner edge, a longitudinal bending secondary matrix shaped to rest on the upper face of said primary matrix, said secondary matrix comprising shaping means in back of said knife enabling the bending of the sheet metal by the combined action of the bending wedge and of the shaping means, an eccentric associated to the pivoting device so that when the rocker head is in said first position, the cutting means, following a drawing of the table towards the cutting means, slide along the internal face of said knife to shear the sheet metal and after said rocker head has pivoted 180°, said rocker head is in said second position, the bending wedge is aligned with said shaping means to bend said sheet metal upon upward movement of said table.

2. A machine according to claim 1, wherein said rocker head comprises pressure means adapted to rest on the sheet metal and capable of preventing the latter to move during shearing.

3. A machine according to claim 2, wherein said pressure means comprises constant pressure cylinders with holding rods aligned along the first horizontal edge of said rocker head so that when the table is drawn towards the shearing means, the holding rods rest against the sheet metal with sufficient pressure to prevent any movement of the latter during the shearing of said sheet metal.

4. A machine according to claim 3, wherein the constant pressure cylinders comprise hydraulic pistons connected to an oil reservoir.

5. A machine according to claim 1, wherein the tble contains transverse members enabling to slide the sheet metal thereon.

6. A machine according to claim 5, wherein each transverse member comprises at least one extension which enables to increase the support surface of said table.

7. A machine according to claim 6, wherein each transverse member is provided with at least a pair of studs on its lateral sides, each of the extensions is provided with a pair of flanges, which are terminated by a hook so that when a larger support surface is required, the pair of flanges are allowed to slide along the lateral sides of a transverse member until the hooks engage said studs, thus providing said larger surface.

8. A machine according to claim 1, wherein the primary matrix comprises a rectangular rod whose rear face forms at least in part a first rectangular knife embedded in said rectangular rod, said first rectangular knife having a cutting edge, said cutting edge constituting the inner edge of said rectangular rod and consequently of said primary matrix, the upper face being formed of a recess in back of said first rectangular knife, said recess being adapted to prevent the secondary matrix to move when the latter has been placed on said first matrix in shearing position of said machine.

9. A machine according to claim 8, wherein the secondary matrix includes grooves of various shapes, depending on the degree of bending which is required.

10. A machine according to claim 5, wherein each transverse member comprises a slit on its upper face, said slit being adapted to receive a stopper which enables to determine the distance between the end of a sheet metal to be sheared or bent and a required shearing or bending of said sheet metal.

11. A machine according to claim 1, wherein the rocker head comrpises a rectangular steel member which is sufficiently thick to keep it rigid.

12. A machine according to claim 11, which comprises a reinforcing member welded on the rectangular member along the first edge thereof.

13. A machine according to claim 9, wherein the rocker head comprises a rectangular cut out portion made along said first edge, a second rectangular knife having a cutting edge mounted in said cut out portion, the cutting edge of said second knife being aligned with the cutting edge of said first knife.

14. A machine according to claim 13, wherein said second knife is bolted in said cut out portion.

15. A machine according to claim 1, wherein said second edge of said rocker head comprises a longitudinal channel, a wedge-carrying-plate bolted in said channel, said wedge-carrying-plate having an extension outside said second edge, to constitute said bending wedge.

16. A machine according to claim 1, wherein said pivoting device as well as the eccentric which is associated therewith comprises cylindrical members formed from said rocker head at the two lateral ends thereof, along the horizontal axis of said rocker head, said cylindrical members each comprising an extension outside said rocker head, each extension being similarly offset with respect to the axis of said cylindrical members, a bushing disposed in each said upright members, each of said eccentric extensions extending through an upright member by means of said bushing disposed in said upright member, the two eccentric extensions extending on the other hand outside of said framework, a partially toothed gear fixedly mounted at the end of one of said eccentric extensions, a gear segment mounted on said framework and engaging siad partially toothed gear, two pistons operating in opposite directions, fixedly mounted on said framework and whose rods are connected at the ends of said gear segment, limit switches connected to said pistons so that when the pistons are in operation, the rocker head will pivot only until the first knife will be aligned with the second knife, or when the bending wedge will be aligned with one of the grooves.

17. A machine according to claim 4, which comprises a hydraulic fluid duct horizontally mounted on the face of said rocker head opposite said hydraulic pistons, junctions along said duct enabling the introduction of the fluid in each hydraulic piston, and means to provide a constant pressure inside said pistons, said duct communicating with an oil reservoir provided inside said framework.

18. A machine according to claim 13, wherein said first edge of said rocker head and consequently said second knife, is oblique with respect to the surface of said table.

19. A machine according to claim 8, wherein the secondary matrix comprises a longitudinal tongue, said tongue being shaped to be inserted in the longitudinal recess provided in said primary matrix, when the secondary matrix is placed on said primary matrix in order to use the machine for bending a sheet metal.

20. A machine according to claim 19, wherein said secondary matrix comprises a groove on its upper face, the degree of opening of said groove varying depending on the degree of bending which is required.

21. A machine according to claim 1, wherein the means enabling the table to be vertically displaced comprise a vertical support for said table, triangular levers connected to said support, and a motor operating said triangular levers to raise or lower said table.

22. A machine according to claim 21, which comprises two pairs of vertical plates which are parallel to one another and are disposed on both sides of said vertical support, the space between each pair of plates constituting a lever chamber, a first triganular lever being pivotally mounted at one of its apex on the pair of plates, and being located at one end of said lever chamber, a second triangular lever being pivotally mounted at one of its apex on the same pair of plates, but at the other end of the lever chamber, a piston and a motor to operate said piston, said piston being connected to a first axle, said axle being pivotally connected to a second apex of said first triangular lever, a second axle being connected to said vertical support so as to upwardly or downwardly move said vertical support as a result of a vertical displacement of said second axle, a mechanical connection pivoting at both ends thereof and connecting said second axle and the third apex of said first triangular lever, a pivoting coupling connecting the third apex of said first triangular lever to be corresponding apex of the second triangular lever, a third axle connected to said vertical support at the other end of the lever chamber so as to move the vertical support in the same manner as under the action of the first triangular lever, so that as a result of the movement of the piston in one direction or the other, the vertical support will raise or lower said table.

23. A machine according to claim 22, which comprises means to ensure that the table does not move past upper and lower vertical limits.

24. A machine according to claim 23, which comprises a vertical rod connected to said table, an upper contact and a lower contact located along said rod, limit switches such that when they contact the upper and lower contacts, they stop upward or downward movement of the table.

25. A machine according to claim 24, which comprises control means enabling to cause pivoting of the rocker head in one way or the other and to raise or lower said table.

26. A machine according to claim 1, which comprises camming means associated with the pivoting device enabling to adjsut the level of the rocker head.

27. A machine according to claim 1, wherein the bending wedge comprises a system of two lower rollers and one upper roller as well as a motor to operate said rollers, said rollers being arranged to enable a sheet metal to slide therebetween to bend said sheet metal.

* * * * *